3,766,190
PROCESS FOR PREPARING PURE 4-BROMO-3-HYDROXY-QUINOPHTHALONE

Ernst Spietschka, Oberauroff, and Friedrich Ische, Kelkheim, Germany, assignors to Farbwerke Hoechst Aktiengesellschaft vormals Meister Lucius & Bruning, Frankfurt am Main, Germany
No Drawing. Continuation-in-part of abandoned application Ser. No. 854,764, Sept. 2, 1969. This application Mar. 17, 1971, Ser. No. 125,322
Int. Cl. C07d *33/36*
U.S. Cl. 260—289 QP                    4 Claims

ABSTRACT OF THE DISCLOSURE

Improved process for the preparation of pure 4-bromo-3-hydroxy-quinophthalone, wherein 3 - hydroxy-quinophthalone is reacted with bromine in sulfuric acid of 96 to 100 percent strength at a temperature between about 0° and 40° C. The product so obtained dyes polyester materials even yellow tints independent of the pH-value of the dyeing medium and without undesired deposits on the material to be dyed. Moreover, the dyestuff is obtained in pure form so that subsequent purification is not necessary.

---

This is a continuation-in-part application of our copending application Ser. No. 854,764, filed Sept. 2, 1969 (now abandoned).

The present invention relates to an improved process for preparing pure 4-bromo-3-hydroxy-quinophthalone.

It is known from U.S. Pat. No. 2,006,022 to prepare 4-bromo - 2 - hydroxy-quinophthalone by reacting 3-hydroxy-quinophthalone with bromine in boiling glacial acetic acid. On fibers and sheets or films of polyethylene terephthalates this compound yields yellow dyeings or prints that are distinguished by an improved fastness to thermofixation as compared with dyeings and prints produced with 3-hydroxy-quinophthalone. The brominated 3-hydroxy-quinophthalone prepared by the known process cited above has, however, the disadvantage that the tint of the dyeings on fibers and sheets or films of polyethylene-terephthalates depends on the hydrogen ion concentration of the dye bath. At a pH of 7 and more, i.e. in the neutral and alkaline range, the said fibers or sheets are dyed a greenish yellow tint, whereas at a pH of less than 7, that is to say in an acidic pH-range, reddish yellow to orange dyeings are obtained. This fact is, for example, very unfavorable for dyeings and prints produced in the presence of carrier materials containing phenolic hydroxy groups, for example o-phenyl-phenol, since the weak acidity of the phenolic groups is already sufficient to impart an undesired reddish tinge to the dyeing or the print. This disadvantageous property of the dyestuff prepared according to the known process is probably due to a partial addition of hydro-bromide on the dyestuff molecule during bromination of the 3-hydroxy-quinophthalone.

This drawback can not be entirely overcome even by dissolving the dyestuff prepared in this way several times in dilute aqueous alkali metal hydroxide solution and reprecipitating it with an acid.

According to German Pat. No. 1,229,663 it is furthermore known that 4-bromo-3-hydroxy-quinophthalone can be obtained by condensation of phthalic acid anhydride and 3-hydroxy-quinaldine-4-carboxylic acid and subsequent bromination of the condensation melt. This product is not sufficiently pure and, for example after having been finely divided, it yields a dyestuff that tends to leave deposits on the material dyed.

It has now been found that pure 4-bromo-3-hydroxy-quinophthalone of the formula

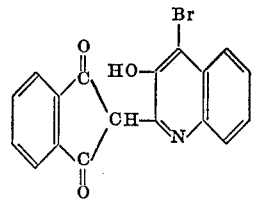

which dyes fibers, sheets or films of aromatic polyesters, especially polyethylene-terephthalates, even yellow tints from an aqueous dispersion, independent of the pH-value, can be prepared by reacting 3-hydroxy-quinophthalone of the formula

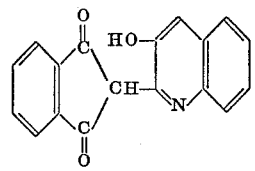

with bromine in sulfuric acid of 96 to 100 percent strength at a low temperature, advantageously between 0° C. and 40° C., where required in the presence of a catalyst such, for example, as iodine. The dyestuff is suitably isolated by pouring the reaction mixture in ice or water and suction-filtering it. Bromination is preferably carried out at a temperature between about 20° and 40° C., preferably using an approximately stoichiometric amount of bromine. It is, however, also possible to use an excess of bromine of up to about 10 percent of the theoretically required amount.

It is already known from the U.S. Pat. No. 807,782 that indigo may be brominated with bromine in sulfuric acid, but if a sulfuric acid of a strength above 96% is used in this process, nearly all indigo will be sulfonated thus yielding an undesired water-soluble product. It was therefore surprising that in the case of 3-hydroxy-quinophthalone no sulfonation takes place under these conditions.

The 4-bromo-3-hydroxy-quinophthalone prepared in this manner allows even yellow dyeings and prints to be obtained at an alkaline and neutral pH as well as at an acidic pH-value, without leaving deposits on the said materials.

The process of the present invention yields 4-bromo-3-hydroxy-quinophthalone in pure form so that purification by reprecipitation or recrystallization is not necessary.

Moreover, the dyestuff is obtained in small uniform crystals upon decomposition of the reaction mixture by pouring in ice or water, whereby a subsequent dispersion of the dyestuff in finely divided form is considerably facilitated. The product is, advantageously, finely divided by grinding or kneading, which requires considerably less time for the dyestuff prepared according to the invention than for products obtainable in solvents or in water.

In finely divided form the dyestuff dyes fibers, sheets or films of aromatic polyesters, especially polyethylene-terephthalates, pure yellow tints having good fastness properties from an acidic, neutral or alkaline dispersion.

The following examples serve to illustrate the invention, but they are not intended to limit it thereto, the parts and percentages being by weight unless stated otherwise.

EXAMPLE 1

100 parts of 3-hydroxy-quinophthalone were dissolved in 1,000 parts of sulfuric acid of 96 percent strength, and a mixture of 56 parts of bromine and 0.2 part of iodine was introduced into this solution during 30 to 60 minutes. The reaction mixture was stirred for 5 to 20 hours.

Thin layer chromatogram control made sure that bromination yielding pure 4-bromo-3-hydroxy-quinophthalone was complete. After complete reaction the reaction mixture was poured on 1,000 parts of ice, whereupon the dyestuff precipitated in pure form as uniform small crystals. The dyestuff was suction-filtered, washed neutral and dried.

125 parts of 4-bromo-3-hydroxy-quinophthalone having a melting point of 248° C. were obtained, and after having been finely divided, for example by grinding or kneading, it dyed fibers, sheets or films of aromatic polyesters pure yellow tints from an acidic, neutral or alkaline dispersion.

EXAMPLE 2

100 parts of 3-hydroxy-quinophthalone were dissolved in 500 parts of sulfuric acid monohydrate, and 56 parts of bromine were added thereto during 1 hour at room temperature. After stirring for 5 hours at room temperature the reaction mixture was poured during 30 minutes into a mixture of 3,500 parts of ice and 1,500 parts of water, whereupon the dyestuff precipitated in uniform particles having a size of from about 0.1 to 1 micron. The mixture was then heated to 90–95° C. for 1 hour, suction filtered, washed to neutral and dried. 125 parts of a dyestuff were obtained, the properties of which corresponded to those of the product obtained according to Example 1.

We claim:

1. In the process for preparing 4-bromo-3-hydroxy-quinophthalone of the formula

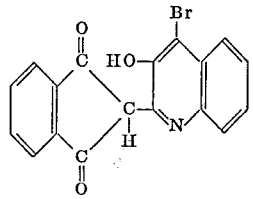

by brominating 3-hydroxy-quinophthalone of the formula

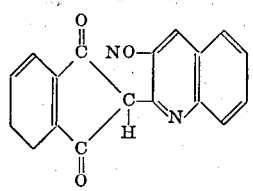

in the presence of an acid, the improvement which consists essentially of reacting 3-hydroxy-quinophthalone with bromine in sulfuric acid of 96–100 percent strength at a temperature between about 0° C. and about 40° C. in the presence or absence of iodine as a catalyst, pouring the reaction mixture on ice, and isolating the precipitated dyestuff.

2. The process as claimed in claim 1, wherein the reaction is carried out at a temperature between 20° and 40° C.

3. A process as in claim 1 proceeding in the presence of iodine as a catalyst.

4. A process as in claim 1 proceeding in the absence of iodine as a catalyst.

References Cited

UNITED STATES PATENTS

| | | | |
|---|---|---|---|
| 807,782 | 12/1905 | Schmidt | 260—289 |
| 2,457,078 | 12/1948 | Zienty | 260—694 |

DONALD G. DAUS, Primary Examiner

U.S. Cl. X.R.

8—179; 260—694